(12) United States Patent
Kim et al.

(10) Patent No.: US 10,901,149 B2
(45) Date of Patent: Jan. 26, 2021

(54) BEAM STEERING DEVICE AND SYSTEM INCLUDING THE SAME

(71) Applicant: SAMSUNG ELECTRONICS CO., LTD., Suwon-si (KR)

(72) Inventors: Sunil Kim, Osan-si (KR); Junghyun Park, Seoul (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 209 days.

(21) Appl. No.: 15/977,785

(22) Filed: May 11, 2018

(65) Prior Publication Data

US 2019/0025509 A1 Jan. 24, 2019

(30) Foreign Application Priority Data

Jul. 24, 2017 (KR) .................. 10-2017-0093688

(51) Int. Cl.
*G02F 1/29* (2006.01)
*G02B 6/12* (2006.01)
(Continued)

(52) U.S. Cl.
CPC ........ *G02B 6/12014* (2013.01); *G01S 7/4817* (2013.01); *G01S 17/36* (2013.01); *G02F 1/292* (2013.01); *G02B 2006/12104* (2013.01)

(58) Field of Classification Search
CPC .... G02F 1/292; G02F 1/2955; G02F 2203/24; G02F 2203/50; G02F 1/0102; G02F 1/011; G02F 1/0356; G02F 1/055; G02F 1/065; G02F 1/21; G02F 1/225; G02F 1/3137; G02F 1/3515; G02F 1/3611; G02F 1/3612; G02F 1/3613; G02F 1/3614; G02F 1/3615; G02F 1/365; G02F 2001/212; G02F 2001/311; G02F 2201/06; G02F 1/0018; G02F 1/0121; G02F 1/0126; G02F 1/0316; G02F 1/19; G02F 2203/10; G02B 19/0057; G02B 2006/12104; G02B 27/0916; (Continued)

(56) References Cited

U.S. PATENT DOCUMENTS 7,855,696 B2   12/2010 Gunmalla et al.
9,080,866 B1 *  7/2015 Dowdall ................. G01S 17/04
(Continued)

FOREIGN PATENT DOCUMENTS

CN            102480058 A      5/2012

*Primary Examiner* — Brandi N Thomas
(74) *Attorney, Agent, or Firm* — Sughrue Mion, PLLC (57) ABSTRACT

A beam steering device and a system using the same are provided. The beam steering device includes a plurality of transmission type optical modulation devices provided to steer an incident beam in different directions, wherein each of the plurality of transmission type optical modulation devices includes: a phase modulator including a nanoantenna in which a plurality of nanostructure rows are arranged. Each of the nanostructure rows includes a plurality of nanostructures connected to each other. A meta surface includes the plurality of nanostructure rows. Each of the transmission type optical modulation devices also includes a plurality of drivers provided which independently apply an electric signal to each of the nanostructure rows to control a phase change thereof.

19 Claims, 8 Drawing Sheets

(51) Int. Cl.
*G01S 17/36* (2006.01)
*G01S 7/481* (2006.01)

(58) Field of Classification Search
CPC .. G02B 6/12014; G02B 26/001; G02B 26/06;
G02B 6/1226; G02B 6/2848; G02B
6/2931; G02B 6/29358; G02B 6/29373;
G02B 6/29395; G02B 6/32; G02B
6/3516; G02B 6/3524; G02B 6/356;
G02B 26/0875; G02B 27/0905; G02B
27/0994; G02B 6/032
USPC .................................................. 359/316–321
See application file for complete search history.

(56) References Cited

U.S. PATENT DOCUMENTS

| | | | |
|---|---|---|---|
| 9,116,302 B2* | 8/2015 | McCarthy | B82Y 20/00 |
| 2016/0231488 A1 | 8/2016 | Kharatiyan | |
| 2017/0040711 A1* | 2/2017 | Rakib | H01Q 1/246 |

* cited by examiner

BEAM STEERING DEVICE AND SYSTEM INCLUDING THE SAME

CROSS-REFERENCE TO RELATED APPLICATION

This application claims priority from Korean Patent Application No. 10-2017-0093688, filed on Jul. 24, 2017, in the Korean Intellectual Property Office, the disclosure of which is incorporated herein in its entirety by reference.

BACKGROUND

1. Field

Apparatuses consistent with exemplary embodiments relate to beam steering devices and systems including the same.

2. Description of the Related Art

Several methods have been proposed to steer a beam to a desired position. There is a mechanical method by which an element irradiated by a beam is mechanically rotated, and a non-mechanical method by which an optical phased array (OPA) is used to steer a beam.

Mechanical beam steering utilizes a motor or a microelectromechanical system (MEMS) structure to steer the beam to the desired position. Mechanical beam steering using a motor steers light emitted from a laser diode or from a light-emitting diode while rotating an entire component. Mechanical beam steering using such a motor may increase the volume and cost of a steering system, and noise may be generated by use of the motor.

Also, beam steering using a MEMS structure provides only a small viewing angle, and when light of high power is irradiated, a transmission distance of the light may be reduced due to stress applied to a mirror. Also, a vibration problem may occur and thus, the application of this type of beam steering may be limited. Due to the characteristics of a driving method, an operation response time may be slow—i.e. more than several microseconds.

On the other hand, as a non-mechanical method using an OPA, there is a method of using interference of a bundle of beams in the form of a waveguide and a method of using a nanostructure as a reflector. In an OPA method using the waveguide, a driving pixel must be provided for each waveguide for electric or thermal driving, and a driver for a driving pixel must be provided, and thus the required circuitry and the device as a whole are complicated and the processing price may increase. In addition to the complexity of the driving pixel, a reflection method using a nanostructure has the problem of long distance detection due to low reflection efficiency, which makes it difficult to put it into practical use.

SUMMARY

One or more exemplary embodiments may provide a beam steering device to which a transmission type meta structure is applied and a system including the beam steering device.

Additional exemplary aspects will be set forth in part in the description which follows and, in part, will be apparent from the description, or may be learned by practice of the presented exemplary embodiments.

According to an aspect of an exemplary embodiment, a beam steering device includes a plurality of transmission type optical modulation devices provided to steer an incident beam in different directions, wherein each of the plurality of transmission type optical modulation devices includes: a phase modulator including a nanoantenna in which a plurality of nanostructure rows in which a plurality of nanostructures are connected to each other are arranged and a meta surface including the plurality of nanostructure rows; and a plurality of drivers provided to independently apply an electric signal in unit of the nanostructure row to control a phase change of each of the plurality of nanostructure rows.

Each of the plurality of nanostructure rows may form a line type phase modulator, wherein the line type phase modulator includes an array of line type phase modulators that modulate a phase in unit of a line.

The plurality of nanostructure rows may be arranged one-dimensionally (i.e. in a one-dimensional array) in each of the plurality of transmission type optical modulation devices.

The plurality of transmission type optical modulation devices may include a first transmission type optical modulation device and a second transmission type optical modulation device, and wherein, when a nanostructure row provided in the first transmission type optical modulation device is referred to as a first nanostructure row and a nanostructure row provided in the second transmission type optical modulation device is referred to as a second nanostructure row, a plurality of first nanostructure rows are arranged in a first direction and a plurality of second nanostructure rows are arranged in a second direction.

The first transmission type optical modulation device and the second transmission type optical modulation device may be arranged such that the first direction which is an arrangement direction of the plurality of first nanostructure rows and the second direction which is an arrangement direction of the plurality of second nanostructure rows cross with each other.

The first transmission type optical modulation device and the second transmission type optical modulation device may have the same structure and are arranged to steer an incident beam in directions crossing each other to steer the incident beam two-dimensionally.

The plurality of transmission type optical modulation devices may have the same structure and are arranged to steer the incident beam in different directions.

The plurality of transmission type optical modulation devices may be arranged on the same beam path in different planes to steer the incident beam two-dimensionally by a combination of the plurality of transmission type optical modulation devices.

The plurality of transmission type optical modulation devices may be spaced apart from each other.

The plurality of transmission type optical modulation devices may have a combined structure.

The phase modulator may include an active layer having a refractive index varying according to an electrical control and a nanoantenna on the active layer, and wherein the nanostructure row and the active layer corresponding to the nanostructure row form a line type phase modulator.

The active layer may include a region having a carrier concentration varying depending on an applied voltage.

The active layer may include a transparent conductive oxide, a transition metal nitride, $LiNbO_3$, $LiTaO_3$, potassium tantalate niobate (KTN), lead zirconate titanate (PZT), or a polymer material having an electro-optic characteristic.

The beam steering device may further include an insulating layer between the active layer and the nanoantenna.

According to an aspect of another exemplary embodiment, a Light detection and Ranging (LiDAR) system includes: a light source unit; the beam steering device configured to two-dimensionally steer light from the light source unit to an object; and a sensor unit configured to receive light steered in the beam steering device, irradiated to the object, and then reflected from the object.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Hereinafter, a beam steering device and a system including the beam steering device according to exemplary embodiments will be described in detail with reference to the accompanying drawings Like reference numerals in the drawings denote like devices, and the sizes and thicknesses of the respective devices may be exaggerated for convenience of explanation. On the other hand, the exemplary embodiments described below are merely illustrative, and various modifications are possible from these embodiments. Hereinafter, when a layer is described as being provided on "on", "upper portion", or "above" of a substrate or other layer, the layer may be on the substrate or directly on another layer, and another layer may be present therebetween. As used herein, the term "and/or" includes any and all combinations of one or more of the associated listed items. Expressions such as "at least one of," when preceding a list of devices, modify the entire list of devices and do not modify the individual devices of the list.

Figure 1:
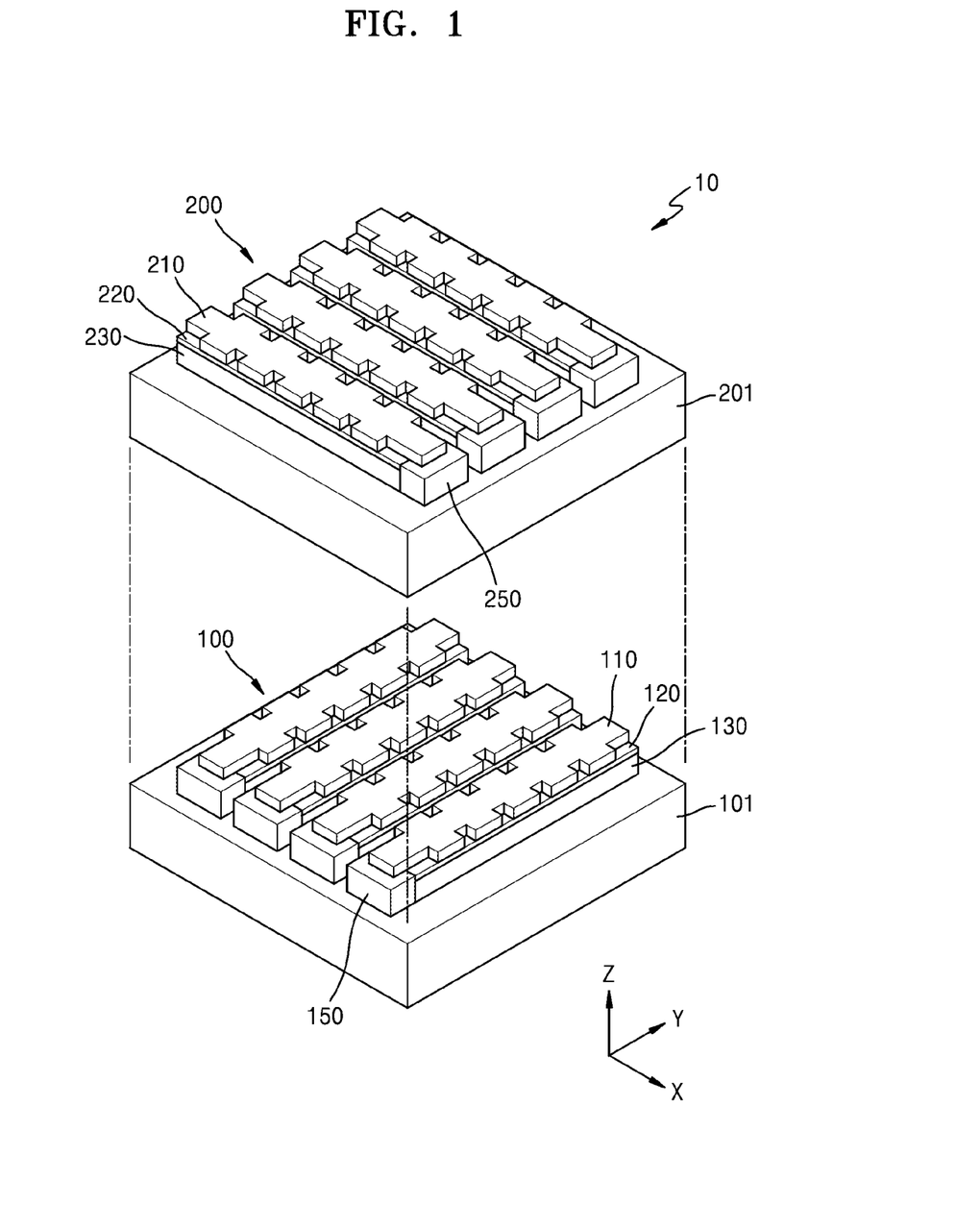
FIG. 1 schematically shows an exemplary structure of a beam steering device according to an exemplary embodiment.

FIG. 1 schematically shows an exemplary structure of a beam steering device 10 according to an exemplary embodiment.

Referring to FIG. 1, the beam steering device 10 includes a plurality of transmission type optical modulation devices, for example, first and second transmission type optical modulation devices 100 and 200, provided to steer an incident beam in different directions. Although a case in which the beam steering device 10 according to an exemplary embodiment includes two transmission type optical modulation devices, that is, the first and second transmission type optical modulation devices 100 and 200, will be described as an example, the embodiment is not limited thereto, and three or more transmission type optical modulation devices may be arranged to steer the incident beam in different directions.

Each of the first and second transmission type optical modulation devices 100 and 200 is a transmission type meta device having a meta surface formed of a nanoantenna. The nanoantenna may be driven in units of nanostructure rows 110 and 210 in which a plurality of nanostructures are connected to each other. That is, in the first and second transmission type optical modulation devices 100 and 200, the nanoantenna may have a configuration in which a plurality of nanostructure rows 110 and 210 are arranged and may be independently driven in units of the nanostructure rows 110 and 210. Each of the plurality of nanostructure rows 110 and 210 includes a plurality of nanostructures connected to each other and extending in one dimension.

Each of the first and second transmission type optical modulation devices 100 and 200 may include a phase modulator including the plurality of independently driven nanostructure rows 110 and 210 and a plurality of drivers 150 and 250 that control a phase by independently applying an electric signal in units of the nanostructure rows 110 and 210. Thus, the nanoantenna may have a structure in which the plurality of nanostructure rows 110 and 210 are arranged in an array, and the nanostructure rows 110 and 210 and active layers 130 and 230 corresponding to the nanostructure rows 110 and 210 form a line type phase modulators, such that the phase modulator may have a structure including the line type phase modulators that modulates the phase in units of lines.

The phase modulator of the first transmission type optical modulation device 100 and the phase modulator of the second transmission type optical modulation device 200 may have a meta surface including the plurality of nanostructure rows 110 and 210 and may control the phase according to an electric signal independently applied to each nanostructure row from the plurality of drivers 150 and 250.

The first transmission type optical modulation device 100 may include, for example, a first phase modulator and the first driver 150 disposed on a first substrate 101 that is transparent with respect to a wavelength used in the optical modulation device. The [example of the wavelength to which the substrate is transparent] first phase modulator may include the first active layer 130 having a refractive index that is variable according to application of an electrical signal, and a first nanoantenna in which the plurality of first nanostructure rows 110, each including a plurality of nanostructures connected to each other, are arranged on the first active layer 130. A first insulating layer 120 may be provided between the first active layer 130 and the first nanostructure row 110.

The second transmissive type optical modulation device 200 may include, for example, a second phase modulator and the second driver 250 disposed on a second substrate 201 which is transparent with respect to a wavelength used in the optical modulation device. The second phase modulator may include the second active layer 230 having a refractive index that is variable according to application of an electrical signal, and a second nanoantenna in which the plurality of second nanostructure rows 210, each including a plurality of nanostructures connected to each other, are arranged on the second active layer 230. A second insulating layer 220 may be provided between the second active layer 230 and the second nanostructure row 210.

The first and second drivers 150 and 250 may be provided to independently apply an electric signal to each the first nanostructure row 110 and the second nanostructure row 210, respectively, thereby electrically controlling refractive indexes of the first and second active layers 130 and 230 corresponding to the first and second nanostructure rows 110 and 210.

Figure 2:
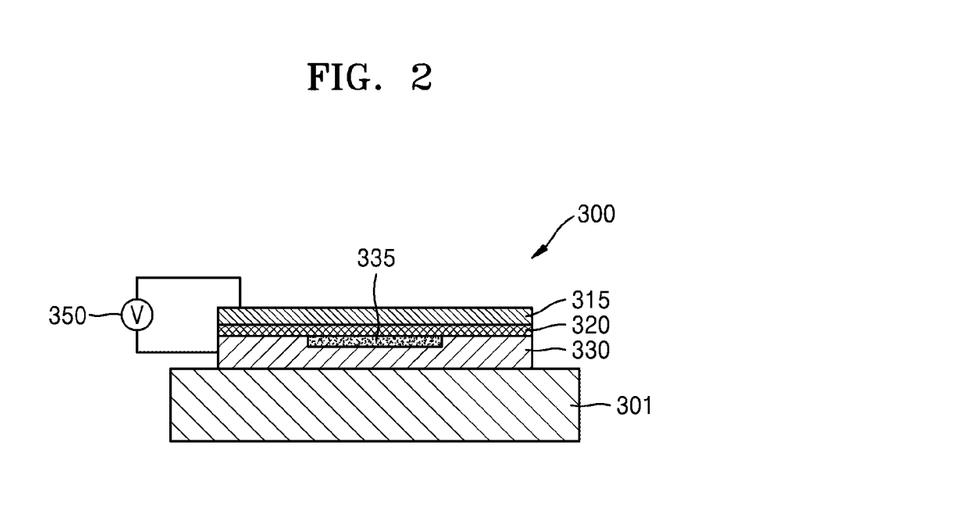
FIG. 2 is a cross-sectional view illustrating an exemplary stack structure of a phase modulator applied to the beam steering device of FIG. 1.

The first phase modulator and the second phase modulator of the first transmission type optical modulation device 100 and the second transmission type optical modulation device 200 may include a phase modulator 300 having a structure as shown in FIG. 2.

FIG. 2 is a cross-sectional view illustrating an exemplary stack structure of the phase modulator 300 applied to the beam steering device 10 of FIG. 1.

Referring to FIG. 2, the phase modulator 300 may include, for example, an active layer 330, having a refractive index that is variable according to an electrical signal applied thereto, disposed on a substrate 301 that is transparent with respect to a wavelength used in the phase modulator, and a nanoantenna 315 disposed on the active layer 330. The phase modulator 300 may further include an insulating layer 320 between the active layer 330 and the nanoantenna 315. The substrate 301 may correspond to the first substrate 101 and the second substrate 201 in FIG. 1. The active layer 330 may correspond to the first active layer 130 and the second active layer 230 in FIG. 1. The nanoantenna 315 may correspond to a first nanoantenna, in which the plurality of first nanostructure rows 110 are arranged, and a second nanoantenna, in which the plurality of second nanostructure rows 210 are arranged, in FIG. 1. The insulating layer 320 may correspond to the first insulating layer 120 and the second insulating layer 220 in FIG. 1.

The substrate 301 may be transparent with respect to the wavelength used in the modulator, and may be formed of any of various insulating materials such as a material containing silicon, a glass material, a plastic material, or the like.

The active layer 330 may be formed of a material having an optical characteristic that is variable depending on an external signal. The external signal may be an electrical signal. The active layer 330 may be formed of a transparent conductive oxide (TCO) such as indium tin oxide (ITO), indium zinc oxide (IZO), aluminum zinc oxide (AZO), and gallium zinc oxide (GZO). Transition metal nitrides such as TiN, ZrN, HfN, and TaN may also be used. In addition, electro-optic materials such as $LiNbO_3$, $LiTaO_3$, potassium tantalate niobate (KTN), and lead zirconate titanate (PZT) having effective permittivity that is variable upon application of an electric signal may be used. Any of a variety of polymeric materials having an electro-optic characteristic may be used.

Figure 3:
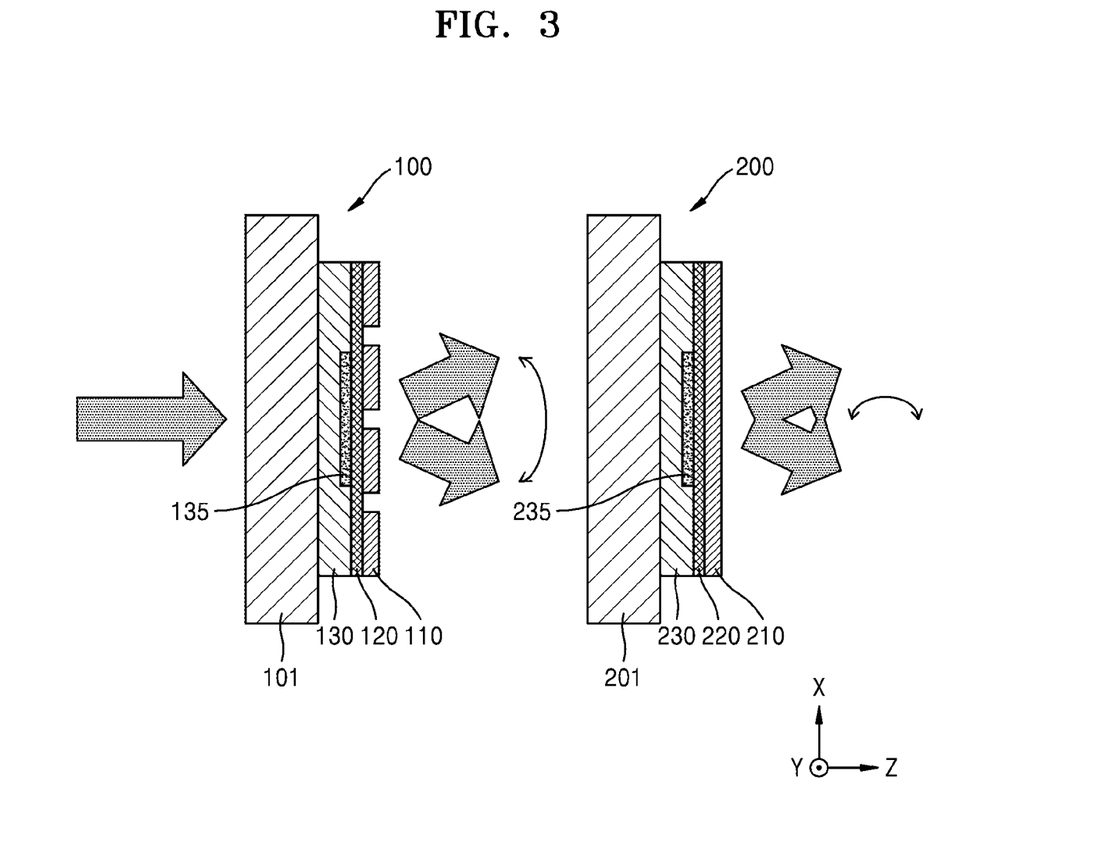
FIG. 3 shows a process by which a beam steering device two-dimensionally steers an incident beam according to an exemplary embodiment.

The active layer 330 may include a region 335 in which a concentration of charge carriers is variable depending on whether a voltage is applied. The carrier variable region 335, within which the carrier concentration is variable, may be formed in the active layer 330, in a region adjacent to the insulating layer 320, i.e., at a position close to a boundary between the insulating layer 320 and the active layer 330. In the case of the first and second transmission type optical modulation devices 100 and 200 of FIG. 1, as shown in FIG. 3, the first active layer 130 and the second active layer 230 may respectively include carrier variable regions 135 and 235 in which the carrier concentration is variable in regions adjacent to the first and second insulating layers 120 and 220.

The carrier concentration of the carrier variable region 335 is variable depending on an applied voltage. The variable carrier concentration may change the permittivity of the active layer 330, specifically, a dielectric constant property with respect to a wavelength, such that a mode of modulating light incident on the phase modulator 300 may be adjusted.

The permittivity of the active layer 330 has a value that varies with the wavelength. A relative permittivity $\varepsilon_r$ with respect to the permittivity $\varepsilon_0$ of vacuum is referred to as a dielectric constant, and a real part of the dielectric constant of the active layer 330 represents a value of 0 in a predetermined wavelength band. The wavelength band in which the real part of the dielectric constant has a value of 0 or very close to 0 is referred to as an epsilon near zero (ENZ) wavelength band. A dielectric constant of most materials is a function of wavelength and may be expressed as a complex number. A dielectric constant of vacuum is 1, and in the case of a typical dielectric material, the real part of the dielectric constant is a positive number greater than 1. In the case of metal, the real part of the dielectric constant may be a negative number. In most wavelength bands, a dielectric constant of most materials has a value greater than 1, but, in a particular wavelength, the real part of the dielectric constant may have a value of 0.

When the real part of the dielectric constant has a value of 0 or very close to 0, the material having the dielectric constant is known to have a specific optical characteristic. An operating wavelength band of the phase modulator 300 of the exemplary embodiment may be a region including the ENZ wavelength band of the active layer 330. That is, by similarly setting a resonance wavelength band of the nanoantenna 315 and the ENZ wavelength band of the active layer 330, a range of controlling the optical modulation performance by the applied voltage may be further increased.

The ENZ wavelength band of the active layer 330 may vary depending on the carrier concentration formed in the carrier variable region 335. In order to utilize the ENZ wavelength band of the active layer 330, the electrical signal applied to the phase modulator 300 may be controlled through a driver 350 such that the resonance wavelength band of the nanoantenna 315 is similar or identical to a wavelength band representing the ENZ property of the active layer 330.

The nanoantenna 315 is an artificial structure having sub-wavelength dimensions (e.g. dimensions less than any wavelength of RF, infrared light or visible light), and strongly interacts with light in a predetermined wavelength band. In this regard, the term "sub-wavelength" refers to a dimension smaller than a wavelength of light to be modulated by the phase modulator 300, that is, the operating wavelength of the nanoantenna 315. For example, the wavelength of light to be modulated by the phase modulator 300 may be any wavelength of RF, infrared light or visible light. Any dimension of a shape of the nanoantenna 315 may be a sub-wavelength dimension.

The above-described function of the nanoantenna 315 is known to be caused by surface plasmon resonance occurring at a boundary between a conductive material and a dielectric material. A resonance wavelength varies depending on a detailed shape of the nanoantenna 315.

In the phase modulator 300 according to an exemplary embodiment, the nanoantenna 315 may have a shape comprising the plurality of first and second nanostructure rows 110 and 210 are arranged as shown in FIG. 1, where each of the first and second nanostructure rows 110 and 210 comprise a plurality of nanostructures connected to each other. The nanostructures may have any of various shapes.

The nanoantenna 315 may be implemented as a conductive nanoantenna. That is, a highly conductive metal material that may generate surface plasmon excitation with a conductive material forming the first and second nanostructure rows 110 and 210 in FIG. 1 may be employed. For example, the nanoantenna 315 may be formed of at least one selected from Cu, Al, Ni, Fe, Co, Zn, Ti, ruthenium (Ru), rhodium (Rh), palladium (Pd), osmium (Os), iridium (Jr), platinum (Pt), silver (Ag) and gold (Au) and may include an alloy including at least one of these. Also, a highly conductive two-dimensional material, such as graphene, or a conductive oxide may be employed. The conductive nanoantenna 315 may have a small thickness so as to be able to transmit a wavelength used in the phase modulator.

Also, the nanoantenna 315 may be formed of a dielectric material and may be implemented as a dielectric nanoantenna. A refractive index of the active layer 330 may be less than a refractive index of the dielectric nanoantenna. The dielectric nanoantenna may be formed of a material having a dielectric constant of 10 or more.

That is, the dielectric nanoantenna may exhibit high antenna efficiency by using Mie resonance due to displacement current. To this end, the dielectric nanoantenna may have a shape with sub-wavelength dimensions and may have a high permittivity, for example, a permittivity higher than the permittivity of the active layer 330.

The term "sub-wavelength" refers to a dimension smaller than the wavelength of the light to be modulated by the phase modulator 300. At least one dimension defining the shape of the dielectric nanoantenna may be a sub-wavelength dimension. For example, when the wavelength of the light to be modulated by the phase modulator 300 is k, the sub-wavelength dimension may be less than $\lambda/2$.

When the nanoantenna 315 is implemented as a dielectric nanoantenna, the dielectric nanoantenna may have a refractive index greater than that of the active layer 330. The dielectric nanoantenna may have a refractive index greater than the largest refractive index in a range in which the refractive index of the active layer 330 is variable according to application of an electrical signal. The dielectric constant of the dielectric nanoantenna may be, for example, 10 or more.

Meanwhile, any of various insulating materials may be used for the insulating layer 320 and may include, for example, SiNx, SiOx, $Al_2O_3$, or $HfO_2$.

Referring to FIG. 1, the plurality of first nanostructure rows 110 provided in the first transmission type optical modulation device 100 may be arranged in a first direction and the plurality of second nanostructure rows 210 provided in the second transmission type optical modulation device 200 may be arranged in a second direction.

At this time, the first direction and the second direction may be directions which intersect each other. For example, the first transmission type light modulation device 100 and the second transmission type light modulation device 200 may be arranged such that the first direction, which is an arrangement direction of the plurality of first nanostructure rows 110, and the second direction, which is an arrangement direction of the plurality of second nanostructure rows 210, intersect each other. FIG. 1 exemplarily shows a case in which the first and second transmission type optical modulation devices 100 and 200 are arranged such that the first direction, which is the arrangement direction of the first nanostructure rows 110 of the first transmission type optical modulation device 100, corresponds to the x-axis direction, and the second direction, which is an arrangement direction of the plurality of second nanostructure rows 210 of the second transmission type light modulation device 200, corresponds to the y-axis direction. As shown, the arrangement direction of the nanostructure rows, for example, the x-axis direction for the first nanostructure rows 110 of the first transmission type optical modulation device 100, is perpendicular to the direction in which each of the nanostructure rows extends. As shown, each of the first nanostructure rows extends in the y-axis direction in the first transmission type optical modulation device 100.

Alternately, when the plurality of transmission type optical modulation devices are configured as the first transmission type optical modulation device 100 and the second transmission type optical modulation device 200, the first transmission type optical modulation device 100 and the second transmission type optical modulation device 200 may have the same structure and may be arranged to steer incident beams in directions intersecting each other. In this case, the incident beam may be two-dimensionally steered by a combination of the first and second transmission type optical modulation devices 100 and 200. The beam steering device 10 according to an exemplary embodiment may thereby implement two-dimensional beam steering.

For two-dimensional beam steering by the beam steering device 10 according to an exemplary embodiment, it may be possible to steer in both the first direction and the second direction, for example, the x direction and the y direction.

The beam steering device 10 according to an exemplary embodiment may include, for example, the first and second transmission type optical modulation devices 100 and 200 corresponding to transmission type meta devices, configuring an x-direction steering unit as the first transmission type optical modulation device 100 and a y-direction steering unit as the second transmission type optical modulation device 200.

The plurality of first drivers 150 may be connected to the plurality of first nanostructure rows 110 constituting the first nanoantenna of the first transmission type optical modulation device 100 so as to independently apply electric signals to each of the plurality of first nanostructure rows 110, and thus an incident beam may be steered, for example, in the x-axis direction. The plurality of second drivers 250 may be connected to the plurality of second nanostructure rows 210 corresponding to the second nanoantenna of the second transmission type light modulation device 200 so as to independently apply electric signals to each of the plurality of second nanostructure rows 210, and thus an incident beam may be steered, for example, in the y-axis direction.

The beam steering device 10 according to an exemplary embodiment may include transmission type optical modulation devices, and thus the first and second transmission type optical modulation devices 100 and 200 may be positioned on the same beam path on different planes. Also, two-dimensional beam steering may be realized by using the first and second transmission type optical modulation devices 100 and 200 having the same structure and arranging nanostructure rows to cross each other, that is, at 90 degree angles to each other.

FIG. 3 shows a process by which the beam steering device 10 steers an incident beam two-dimensionally according to an exemplary embodiment.

Referring to FIG. 3, the first nanostructure rows 110 are arranged in the x direction in the first transmission type optical modulation device 100, the second nanostructure rows 210 are arranged in the y direction in the second transmission type optical modulation device 200, and the first transmission type optical modulation device 100 and the second transmission type optical modulation device 200 are sequentially arranged from a side in which a beam is incident.

When the beam is incident on the first transmission type optical modulation device 100, since the first driver 150 controls an electric signal applied to the first nanostructure rows 110, a traveling direction of the incident beam may be controlled in an x-z plane by the first transmission type optical modulation device 100. The beam steered in the x-z plane is then incident on the second optical transmission type optical modulation device 200. Since the second driver 250 controls an electric signal applied to the second nanostructure row 210, the traveling direction of the incident beam may be controlled in the y-z plane by the second transmission type optical modulation device 200. Therefore, the beam transmitted through the first transmission type optical modulation device 100 and the second transmission type optical modulation device 200 may be steered two-dimensionally.

FIGS. 1 and 3 illustrate a case in which there is a space between the first transmission type optical modulation device 100 and the second transmission type optical modulation device 200. Alternately, the first and second transmission type optical modulation devices 100 and 200 may be combined together, as shown in FIG. 4, instead of being spaced apart.

Figure 4:
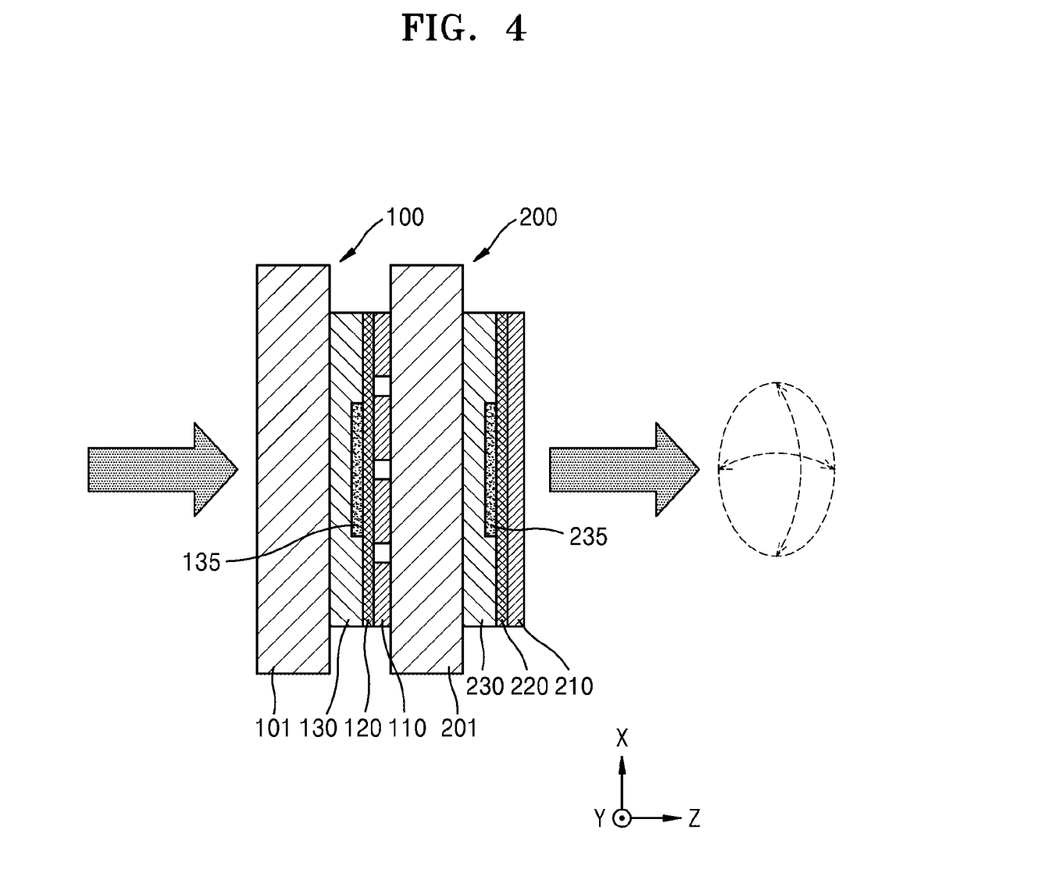
FIG. 4 shows a process by which a beam steering device two-dimensionally steers an incident beam according to an exemplary embodiment.

As shown in FIG. 4, when the first transmission type optical modulation device 100 and the second transmission type optical modulation device 200 are combined together, for example, the second transmission type optical modulation device 200 may include an insulating layer, instead of the second substrate 201 of the first transmission type optical modulation device 100. That is, an insulating layer is stacked on the first nanostructure row 110 of the first transmission type optical modulation device 100, and the second phase modulator and the second driver 250 forming the second transmission type optical modulation device 200 may be formed on the insulating layer.

Figure 5:
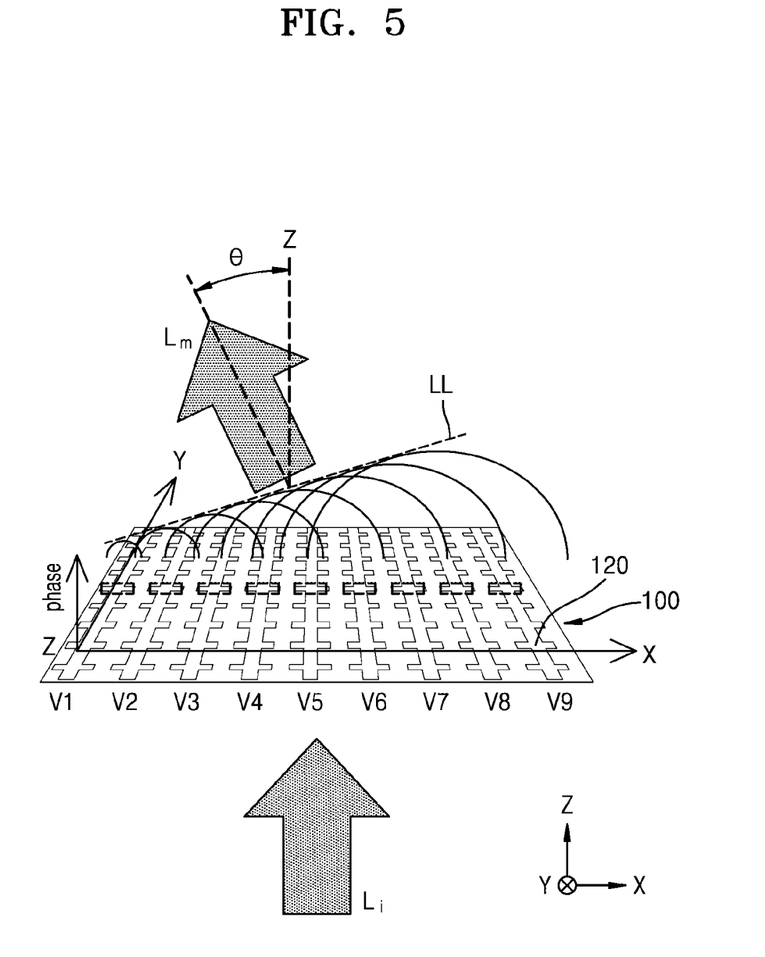
FIG. 5 is a conceptual diagram for explaining a principle of beam steering by a beam steering device according to an exemplary embodiment.

FIG. 5 is a conceptual diagram for explaining a principle of beam steering by the beam steering device 10 according to an exemplary embodiment. FIG. 5 shows an example of a beam steering principle in an optical modulation device in which nanostructure rows are arranged in an x direction, for example, the first transmission type optical modulation device 100.

Each of the plurality of first nanostructure rows 110 included in a first phase modulator of the first transmission type optical modulation device 100 may modulate differently depending on an electrical signal applied from the first driver 150 corresponding to a phase of incident light Li. Modulated light Lm output by the first transmission type optical modulation device 100 may be perpendicular to a transition line LL connecting phase values of the adjacent first nanostructure rows 110.

When a phase transition of the adjacent first nanostructure rows 110 is linear, an adjacent phase difference is $\Delta\varphi$, and a distance between the adjacent first nanostructure rows 110 is d, the incident light Li of a wavelength $\lambda$ is steered in an angular direction $\theta$ defined as follows.

$$\sin\theta = \frac{\Delta\phi}{2\pi}\frac{\lambda}{d}$$

The angular direction $\theta$ is a direction forming an angle $\theta$ with respect to the z direction in an x-z plane.

According to the above conditions, the voltage applied to each of the first nanostructure rows 110 may be set to form a desired phase transition.

The voltage, for example, V1 to V9, applied to each of the first nanostructure rows 110 may be controlled individually. Since the angle formed by the transition line LL with the x-axis may be adjusted, a direction of the modulated light Lm in which the incident light Li is steered may be adjusted in the x-z plane.

By the same principle, the voltage applied to each of the second nanostructure rows 210 of the second transmission type optical modulation device 200 may be controlled individually and a modulated light by the second transmission type optical modulation device 200 may be adjusted by an angle formed by a transition line connecting phase values by the adjacent second nanostructure rows 210 with respect to the y direction, and thus a direction of a modulated beam in which the beam incident on the second transmission type optical modulation device 200 is steered may be adjusted in the y-z plane.

Therefore, the directions of the modulated beams steered by the first transmission type optical modulation device 100 and the second transmission type optical modulation device 200 may be two-dimensionally adjusted.

Figure 6A:
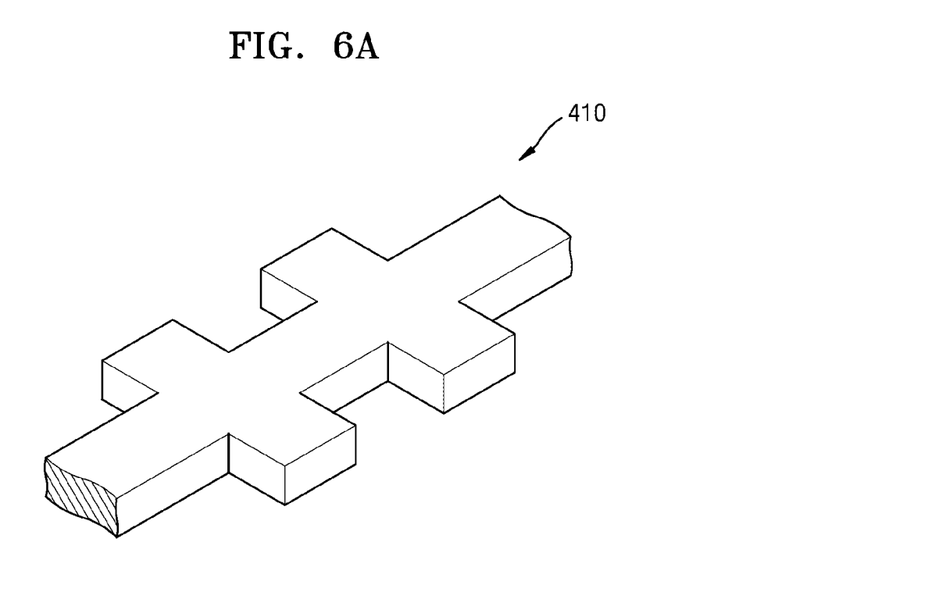
FIGS. 6A, 6B, and 6C show exemplary shapes of nanostructures according to an exemplary embodiment.
Figure 6B:
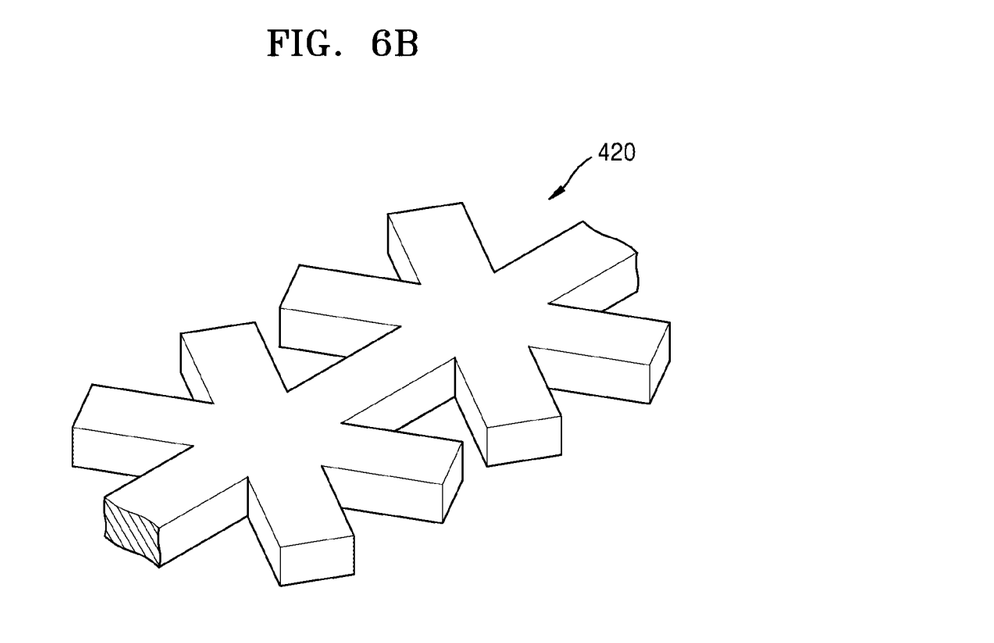
Figure 6C:
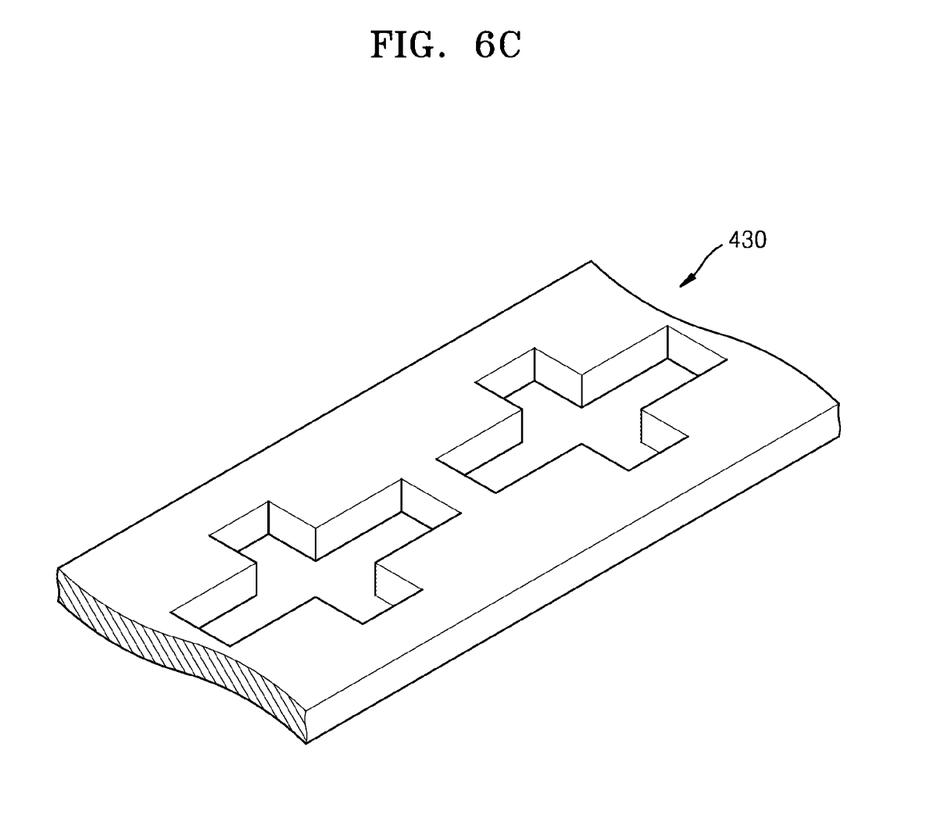

Nanostructures of the first nanostructure row 110 and the second nanostructure row 210 of to the beam steering device 10 according to an exemplary embodiment may have any of various shapes, for example, as shown in FIGS. 6A through 6C.

As shown in FIG. 6A, a nanostructure 410 may have a cross shape, and lengths in two directions forming the cross shape may be the same or different.

As shown in FIG. 6B, a nanostructure 420 may have a star shape in which a plurality of bars are crossed.

As shown in FIG. 6C, a nanostructure 430 may be formed by cross-shaped nano holes. FIG. 6C shows a reverse shape of FIG. 6A but is not limited thereto. For example, FIG. 6C may be formed in a reverse shape of FIG. 6B or in another reverse shape.

A nanostructure may be a combination of two or more of the illustrated shapes, or may be formed in any of various other shapes.

An example in which a phase modulator applied to the first and second transmission type optical modulation devices 100 and 200 of the beam steering device 10 according to an exemplary embodiment is formed as a stacked structure of the active layer 33 including the carrier variable region 335, the insulating layer 320, and the nanoantenna 315 as shown in FIG. 2 is described above, but any of various embodiments may be possible.

Figure 7:
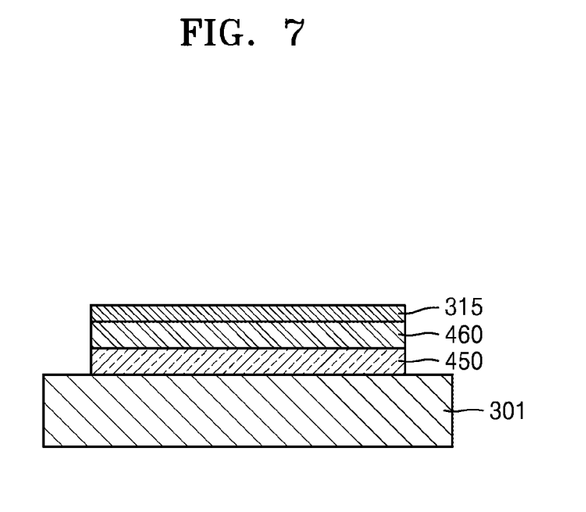
FIGS. 7 and 8 are cross-sectional views of exemplary stack structures of a phase modulator applied to a beam steering device according to an exemplary embodiment.

For example, the phase modulator applied to the first and second transmission type optical modulation devices 100 and 200 of the beam steering device 10 according to an exemplary embodiment may be a structure in which a first semiconductor layer 450 of a first conductivity type and a second semiconductor layer 460 of a second conductivity type, opposite to that of the first semiconductor layer 450, are stacked on the substrate 301, which is transparent with respect to a wavelength used in the modulator, to form a p-n junction, and the nanoantenna 315 is provided thereon as shown in FIG. 7.

Figure 8:
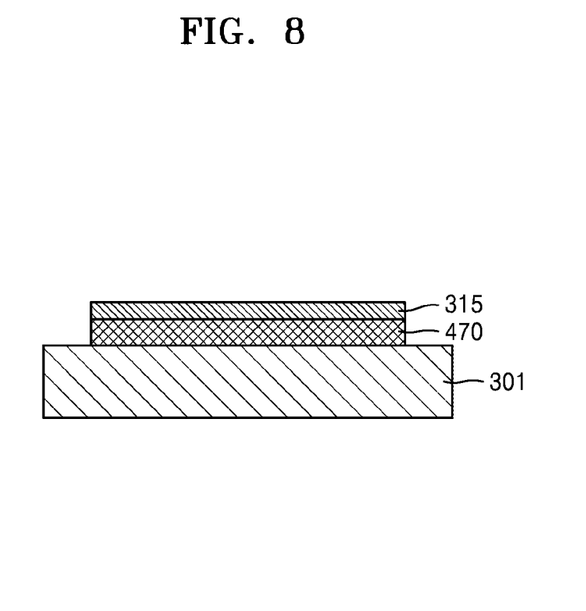

Also, the phase modulator applied to the first and second transmission type optical modulation devices 100 and 200 of the beam steering device 10 according to an exemplary embodiment may be a structure in which the active layer 470 is formed of an electro-optic (EO) material or a thermal-optic (TO) material on the substrate 301, which is transparent with respect to the wavelength used in the modulator, and the nanoantenna 315 is provided directly on the active layer 470 as shown in FIG. 8.

The active layer 470 may be formed of an electro-optic material, for example, $LiNbO_3$, $LiTaO_3$, potassium tantalate niobate (KTN), or lead zirconate titanate (PZT) having effective permittivity that is variable when an electric signal is applied thereto. Also, any of a variety of polymeric materials having an electro-optic characteristic may be used.

An example in which the beam steering device 10, according to an exemplary embodiment, includes first and second transmission type optical modulation devices 100 and 200 as a plurality of transmission type optical modulation devices such that arrangement directions of nanostructure rows of the first and second transmission type optical modulation devices 100 and 200 intersect each other is described and shown above. In the case in which the beam steering device 10 includes three or more transmission type optical modulation devices as the plurality of transmission type optical modulation devices, the arrangement directions of nanostructure rows may be at different angles, and an incident beam may be steered two-dimensionally by adjusting an electric signal applied to each nanostructure row.

Figure 9:
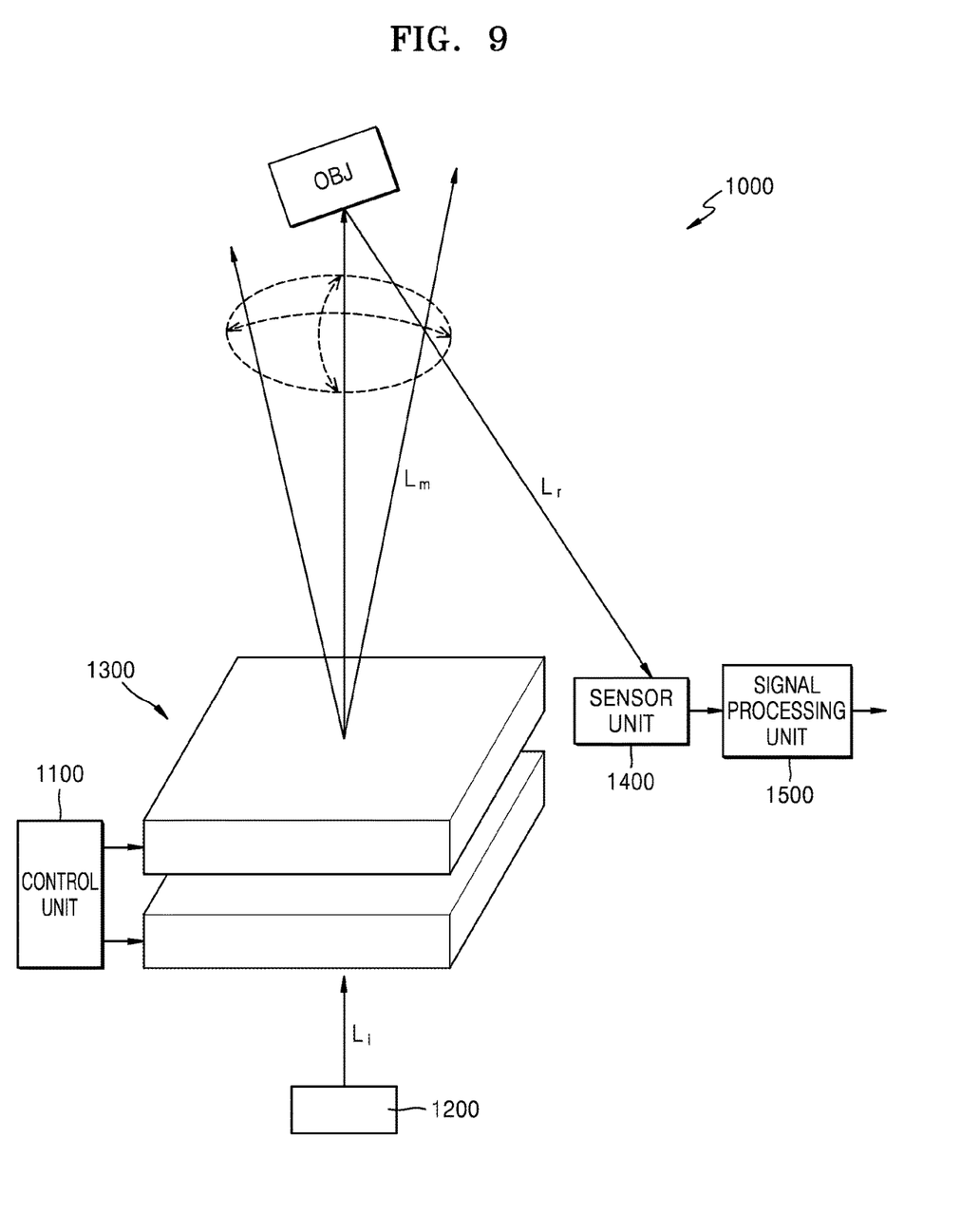
FIG. 9 is a block diagram showing a schematic configuration of a LiDAR system according to an exemplary embodiment.

FIG. 9 is a block diagram showing a schematic configuration of a LiDAR system 1000 according to an exemplary embodiment.

Referring to FIG. 9, the LiDAR system 1000 includes a light source unit 1200 that emits light, a beam steering device 1300 that steers the light emitted from the light source unit 1200 toward an object OBJ, and a sensor unit 1400 that senses the light reflected from the object OBJ.

The LiDAR system 1000 may further include a control unit 1100 that adjusts a phase profile of the beam steering device 1300 and a signal processing unit 1500 that processes a signal sensed by the sensor unit 1400.

The light source unit 1200 irradiates light to be used for analyzing a position and a shape of the object OBJ. The light source unit 1200 may include a light source that generates and emits light having a predetermined wavelength. The light source unit 1200 may include a light source such as a laser diode (LD), a light-emitting diode (LED), a superluminescent diode (SLD), etc. that generates and irradiates light in a wavelength band suitable for analyzing the position and the shape of the object OBJ, for example, light in an infrared band wavelength. The light source unit 1200 may generate and irradiate light in a plurality of different wavelength bands. The light source unit 1200 may generate and irradiate pulsed light or continuous light.

The beam steering device 1300 may include a plurality of transmission type optical modulation devices arranged to independently modulate a phase of the incident light Li to steer the incident beam in different directions so as to steer the incident beam two-dimensionally. The beam steering device 1300 may have a configuration of the beam steering device 10 of the exemplary embodiment described above with reference to FIGS. 1 to 8 or a modified configuration thereof.

Other optical members, for example, members for a path adjustment, for the wavelength division of light irradiated from the light source unit 1200, or for an additional modulation, may be further arranged between the light source unit 1200 and the beam steering device 1300 and/or between the beam steering device 1300 and the object OBJ.

The control unit 1100 may control input signals to a plurality of drivers of the plurality of transmission type optical modulation devices included in the beam steering device 1300 so that the beam steering device 1300 has a phase profile desired to perform a beam steering function. The control unit 1100 may also control the beam steering device 1300 so that a steering direction of the beam steering device 1300 is sequentially controlled and the object OBJ is scanned. The beam steering device 1300 is capable of beam steering in a two dimensional direction by arranging the plurality of transmission type optical modulation devices that steer the incident beam in different directions on the same path and different planes, and thus the object OBJ may be scanned along the two-dimensional direction. Reflected light Lr reflected from the object OBJ while the object OBJ is being scanned is sensed by the sensor unit 1400. A sensed optical signal may be transmitted to the signal processing unit 1500 and may be used for analyzing a presence of the object OBJ, a position, a shape, and the like.

The sensor unit 1400 may include an array of a plurality of sensors for detection of light that senses light reflected from the object OBJ. The sensor unit 1400 may include arrays of sensors capable of sensing light of a plurality of different wavelengths.

The signal processing unit 1500 may perform a predetermined operation from the optical signal detected by the sensor unit 1400, for example, an operation for time-of-flight measurement, and determine a three-dimensional shape of the object OBJ from the predetermined operation. The signal processing unit 1500 may use various operation methods. For example, a direct time measurement method projects pulsed light onto the object OBJ, measures the time the light takes to be reflected by the object OBJ and returned with a timer, and obtains a distance. A correlation method projects pulsed light onto the object OBJ and measures a distance from brightness of the light reflected by the object OBJ and returned. A phase delay measurement method is a method of projecting continuous wave light such as a sine wave onto the object OBJ, detecting a phase difference of the light reflected by the object OBJ and returned and converting the detected phase different into a distance. The signal processing unit 1500 may include a memory for storing programs and other data required for such operations.

The signal processing unit 1500 may transmit information about a result of operations, that is, the shape and the position of the object OBJ, to other units. For example, the above information may be transmitted to a drive control unit or a warning system of an autonomous drive device employing the LiDAR system 1000.

The LiDAR system 1000 may be used as a sensor for acquiring three-dimensional information about an object in real time, and thus may be applied to an autonomous driving device, for example, an unmanned vehicle, an autonomous vehicle, a robot, a drone or the like. The LiDAR system 1000 may be applied not only to an autonomous driving device but also to a black box or the like so that the LiDAR system 1000 may be used to detect front and rear obstacles at night, at a time at which it is difficult to identify an object with only an image sensor.

According to a beam steering device and a system to which the beam steering device is applied according to exemplary embodiments, a plurality of light modulation devices composed of a transmission type meta device are arranged on the same beam path of different planes to steer a beam in different directions, and thus the beam may be steered two-dimensionally.

Since the beam steering device is implemented as a transmission type structure, efficiency of a reflective type structure is good and a driver may be positioned outside a nanoantenna, and thus visibility may be wide and the configuration thereof may be simplified.

While the beam steering device 1300 including the plurality of transmission type optical modulation devices 100 and 200 that steer beams in different directions has been described with reference to the exemplary embodiments shown in the figures, it will be understood by those of ordinary skill in the art that various changes in form and details may be made therein without departing from the spirit and scope as defined by the following claims. It should be understood that exemplary embodiments described herein should be considered in a descriptive sense only and not for purposes of limitation. Descriptions of features or aspects within each embodiment should typically be considered as available for other similar features or aspects in other embodiments.

What is claimed is:

1. A beam steering device comprising:
a plurality of transmission type optical modulation devices disposed on at least two substrates comprising a first substrate and a second substrate,
wherein each of the plurality of transmission type optical modulation devices comprises:
a phase modulator comprising a nanoantenna, the nanoantenna comprising a plurality of nanostructure rows, each of the plurality of nanostructure rows comprising a plurality of nanostructures that are physically connected to and in contact with each other; and
a plurality of drivers, wherein each of the plurality of drivers is configured to independently apply an electrical signal to one of the plurality of nanostructure rows, thereby controlling a phase change thereof,
wherein the first substrate is disposed apart from and in parallel with the second substrate, and
wherein the plurality of nanostructures are arranged on the first substrate in a first direction that is perpendicular to a second direction in which the plurality of nanostructures are arranged on the second substrate.

2. The beam steering device of claim 1, wherein each of the plurality of nanostructures has a same shape and a same orientation.

3. The beam steering device of claim 1, wherein the plurality of nanostructure rows are arranged in a one-dimensional array.

4. The beam steering device of claim 1, wherein:
the plurality of transmission type optical modulation devices comprises a first transmission type optical modulation device and a second transmission type optical modulation device,
the first transmission type optical modulation device comprises a first phase modulator comprising a plurality of first nanostructure rows arranged on the first substrate in the first direction;
the second transmission type optical modulation device comprises a second phase modulator comprising a plurality of second nanostructure rows arranged on the second substrate in the second direction.

5. The beam steering device of claim 4, wherein the first transmission type optical modulation device is configured to steer an incident beam in a first plane and the second transmission type optical modulation device is configured to steer the incident beam in a second plane, substantially normal to the first plane.

6. The beam steering device of claim 1, wherein the plurality of transmission type optical modulation devices comprise a first transmission type optical modulation device configured to steer an incident beam in a first plane and a second transmission type optical modulation device configured to steer the incident beam in a second plane, different from the first plane.

7. The beam steering device of claim 1, wherein the plurality of transmission type optical modulation devices comprise a first transmission type optical modulation device disposed on a beam path in a first plane, and a second transmission type optical modulation device disposed on the beam path in a second plane, different from the first plane, such that a combination of the plurality of transmission type optical modulation devices steers an incident beam two-dimensionally.

8. The beam steering device of claim 7, wherein the second transmission type optical modulation device is spaced apart from the first transmission type optical modulation device.

9. The beam steering device of claim 7, wherein the first transmission type optical modulation device and the second transmission type optical modulation device, together, comprise a combined structure.

10. A beam steering device comprising:
a plurality of transmission type optical modulation devices,
wherein each of the plurality of transmission type optical modulation devices comprises:
a phase modulator comprising a nanoantenna, the nanoantenna comprising a plurality of nanostructure rows, each of the plurality of nanostructure rows comprising a plurality of nanostructures connected to each other; and
a plurality of drivers, wherein each of the plurality of drivers is configured to independently apply an electrical signal to one of the plurality of nanostructure rows, thereby controlling a phase change thereof,
wherein the phase modulator comprises an active layer having a refractive index which is variable according to the electrical signal applied thereto and the nanoantenna disposed on the active layer, and
wherein each of the plurality of nanostructure rows, and a portion of the active layer corresponding thereto, together form a line type phase modulator.

11. The beam steering device of claim 10, wherein the active layer comprises a region having a carrier concentration which is variable depending on a voltage applied thereto.

12. The beam steering device of claim 11, wherein the active layer comprises one of a transparent conductive oxide, a transition metal nitride, $LiNbO_3$, $LiTaO_3$, potassium tantalate niobate (KTN), lead zirconate titanate (PZT), and a polymer material having an electro-optic characteristic.

13. The beam steering device of claim 11, further comprising an insulating layer disposed between the active layer and the nanoantenna.

14. A LiDAR system comprising:
a light source unit;
the beam steering device of claim 1 configured to two-dimensionally steer light from the light source unit to an object; and
a sensor unit configured to receive the light reflected from the object.

15. The LiDAR system of claim 14, wherein the plurality of transmission type optical modulation devices comprise a first transmission type optical modulation device disposed on a beam path in a first plane, and a second transmission type optical modulation device disposed on the beam path in a second plane, different from the first plane, such that a combination of the plurality of transmission type optical modulation devices steers an incident beam two-dimensionally.

16. The LiDAR system of claim 15, wherein the phase modulator comprises an active layer having a refractive index which is variable according to the electrical signal applied thereto and the nanoantenna disposed on the active layer, and
wherein each of the plurality of nanostructure rows, and a portion of the active layer corresponding thereto, together form a line type phase modulator.

17. The LiDAR system of claim 16, wherein the active layer comprises a region having a carrier concentration which is variable depending on a voltage applied thereto.

18. The LiDAR system of claim 17, further comprising an insulating layer disposed between the active layer and the nanoantenna.

19. A beam steering device comprising:
a first transmission type optical modulation device comprising:
a first phase modulator comprising a plurality of first nanostructure rows disposed on a first substrate, each of the plurality of first nanostructure rows comprising a plurality of first nanostructures that are physically connected to and in contact with each other and extending in a first direction;
a plurality of first drivers, wherein a phase of each of the plurality of first nanostructure rows is independently controlled by one of the plurality of first drivers; and
a second transmission type optical modulation device comprising:
a second phase modulator comprising a plurality of second nanostructure rows disposed on a second substrate that is in parallel with the first substrate, each of the plurality of second nanostructure rows comprising a plurality of second nanostructures that are physically connected to and in contact with each other and extending in a second direction, that is perpendicular to the first direction;
a plurality of second drivers, wherein a phase of each of the plurality of second nanostructure rows is independently controlled by one of the plurality of second drivers.

* * * * *